United States Patent [19]

Ishii et al.

[11] Patent Number: 5,666,196
[45] Date of Patent: Sep. 9, 1997

[54] OPTICAL DETECTION APPARATUS FOR DETECTING INFORMATION RELATING TO RELATIVE DISPLACEMENT OF AN OBJECT ON WHCH A DIFFRACTION GRATING IS FORMED

[75] Inventors: Satoshi Ishii, Tokyo; Ko Ishizuka, Ohmiya; Hiroshi Kondo, Yokohama; Yasushi Kaneda, Tokyo, all of Japan

[73] Assignee: Canon Kabushiki Kaisha, Tokyo, Japan

[21] Appl. No.: 560,511

[22] Filed: Nov. 17, 1995

Related U.S. Application Data

[63] Continuation of Ser. No. 249,276, May 25, 1994, abandoned.

[30] Foreign Application Priority Data

May 31, 1993 [JP] Japan .................................. 5-152690

[51] Int. Cl.$^6$ ...................................... G01B 11/00
[52] U.S. Cl. ...................... 356/356; 336/363; 250/237 G
[58] Field of Search ...................... 356/356, 363; 250/237 G

[56] References Cited

U.S. PATENT DOCUMENTS

| | | | |
|---|---|---|---|
| 3,713,139 | 1/1973 | Sanford et al. | 250/237 G |
| 5,068,530 | 11/1991 | Ieki et al. | 250/237 G |
| 5,204,524 | 4/1993 | Ichikawa et al. | 250/237 G |
| 5,214,280 | 5/1993 | Rieder et al. | 250/237 G |
| 5,264,915 | 11/1993 | Huber et al. | 356/356 |
| 5,283,434 | 2/1994 | Ishizuka et al. | 250/237 G |

*Primary Examiner*—Frank G. Font
*Assistant Examiner*—Jason D. Vierra Eisenberg
*Attorney, Agent, or Firm*—Fitzpatrick, Cella, Harper & Scinto

[57] ABSTRACT

An apparatus for optically detecting information relating to the relative displacement of an object on which a diffraction grating, arranged in two axial directions with a predetermined pitch. The apparatus includes a light-emitting device configured to emit a light beam, and a first optical element configured to divide the light beam from the light-emitting device into a plurality of light beams directed in each of the two axial directions to the diffraction grating on the object which produces a plurality of diffracted light beams for each of the two axial directions. The apparatus also includes a second optical element positioned and configured to receive and combine a plurality of diffracted light beams for each of the two axial directions from the diffraction grating on the object, and a plurality of detection units, each configured to receive and detect the combined plurality of diffracted light beams for one of the two axial directions, thereby detecting information relating to the relative displacement of the object in each of the two axial directions.

19 Claims, 10 Drawing Sheets

OPTICAL DETECTION APPARATUS FOR DETECTING INFORMATION RELATING TO RELATIVE DISPLACEMENT OF AN OBJECT ON WHICH A DIFFRACTION GRATING IS FORMED

This application is a continuation of application Ser. No. 08/249,276 filed May 25, 1994, now abandoned.

BACKGROUND OF THE INVENTION

1. Field of the Invention

This invention relates to an apparatus for detecting information relating to the relative displacement of an object to be measured, such as the amount of displacement, the velocity or the like. The invention also relates to a driving system which uses the information detecting apparatus.

In particular, the invention can be reliably applied to an optical displacement sensor, in which light is projected onto an object, and a physical parameter, such as the displacement or velocity, associated with the object is detected using optical means. The invention may also be applied to a driving system which uses the optical displacement sensor.

2. Description of the Related Art

Among optical displacement sensors of this kind, for example, optical encoders, laser interferometers, and the like have been widely used in the fields of NC (numerical control) machine tools, OA (office automation) apparatuses, robots, precision manufacturing apparatuses, and the like.

FIG. 1 is a diagram illustrating the configuration of an optical displacement sensor developed by the assignee of the present application and described in U.S. Pat. No. 5,283,434.

In FIG. 1, light emitted from a light-emitting device 101, such as a semiconductor laser, a light-emitting diode, or the like, is converted into a light beam by a lens 102, and is incident upon a diffraction grating 103A. The light beam is subjected to transmission diffraction by the diffraction grating 103A, and is divided into a plurality of light beams including a 0-order diffracted light beam $R_0$, a +1st-order diffracted light beam $R_{+1}$, and a −1st-order diffracted light beam $R_{-1}$, which beams are incident upon a diffraction grating 112 formed on a scale 111. The diffraction grating 103A, diffraction gratings 103B1, 103B2 and 103C1, 103C2, and the diffraction grating 112 on the scale 111 have the same pitch (for example, 1.6 μm).

The directly-advancing 0-order diffracted light beam $R_0$ is subjected to reflection diffraction at a point P1 on the diffraction grating 112, and is divided, for example, into a +1st-order diffracted light beam $R_0^{+1}$, and a −1st-order diffracted light beam $R_0^{-1}$, which beams are subjected to phase modulation. When the scale 111 has moved relative to the diffraction gratings 103, the phase of the +1st-order diffracted light beam $R_0^{+1}$ is shifted by +2πx/P, and the phase of the +1st-order diffracted light beam $R_0^{-1}$ is shifted by −2πx/P, where x is the amount of movement of the diffraction grating 112, and P is the pitch of the diffraction grating 112.

The above-described +1st-order diffracted light beam $R_0^{+1}$ is again subjected to transmission diffraction by diffraction gratings 103B1 and 103B2, and is divided into a 0-order diffracted light beam $R_0^{+1}{}_0$, a −1st-order diffracted light beam $R_0^{+1}{}_{-1}$, and the like. The −1st-order diffracted light beam $R_0^{+1}{}_{-1}$ becomes perpendicular to the surface of the diffraction grating, and the phase of the beam's wavefront equals +2πx/P.

The −1st-order diffracted light beam $R_0^{-1}$ is subjected to transmission diffraction by diffraction gratings 103C1 and 103C2, and is divided into a 0-order diffracted light beam $R_0^{-1}{}_0$, a +1st-order diffracted light beam $R_0^{-1}{}_{+1}$, and the like. The +1st-order diffrated light beam $R_0^{-1}{}_{+1}$ becomes perpendicular to the surface of the diffraction grating, and the phase of the beam's wavefront equals −2πx/P.

If the phase of the grating's arrangement of the diffraction grating 103C1 is shifted by P/4 relative to that of the diffraction grating 103B1, the phase of the wavefront of the +1st-order diffracted light beam $R_0^{-1}{}_{+1}$ is shifted further by −2π(P/4)/P=−π/2 to become −2πx/P−π/2. If the phase of the grating's arrangement of the diffraction gratings 103B2 and 103C2 are shifted by P/2 relative to those of the diffraction gratings 103B1 and 103C1, respectively, then the phases of respective wavefronts have the following values:

```
103B1: −2πx/P
103B2: −2πx/P − π
103C1: −2πx/P − π/2
103C2: −2πx/P − 3π/2.
```

The light beam $R_{+1}$ subjected to +1st-order diffraction by the diffraction grating 103A is subjected to reflection diffraction at a point P2 on the diffraction grating 112 on the scale 111, and is divided into a −1st-order diffracted light beam $R_{+1}{}^{-1}$, a 0-order diffracted light beam $R_{+1}{}^{0}$, and the like. The phases of the respective light beams are modulated.

The −1st-order diffracted light beam $R_{+1}{}^{-1}$ is incident upon the diffraction gratings 103B1 and 103B2 while the beam's phase is shifted by −2πx/P. The phase of the wavefront of the directly-advancing 0-order diffracted light beam $R_{+1}{}^{-1}{}_0$ is −2πx/P.

The light beam $R_{-1}$ subjected to −1st-order diffraction by the diffraction grating 103A is subjected to reflection diffraction at a point P3 on the diffraction grating 112 on the scale 111, and is divided into a +1st-order diffracted light beam $R_{-1}{}^{+1}$, a 0-order diffracted light beam $R_{-1}{}^{0}$, and the like. The phases of the respective light beams are modulated. The +1st-order diffracted light beam $R_{-1}{}^{+1}$ is incident upon the diffraction gratings 103C1 and 103C2 while the beam's phase is shifted by +2πx/P. The phase of the wavefront of the directly-advancing 0-order diffracted light beam $R_{-1}{}^{+1}{}_0$ equals +2πx/P.

The light beams $R_{+1}{}^{-1}{}_0$ and $R_0^{+1}{}_{-1}$ whose optical paths are superposed at the diffraction gratings 103B1 and 103B2 become interfering light, which is incident upon photosensors 104B1 and 104B2. At that time, the interference phases of the light beams incident upon the photosensors 104B1 and 104B2 are:

(+2πx/P)−(−2πx/P)=4πx/P, and (−2πx/P−π)−(+2πx/P)=−4πx/P−π, respectively.

Every time the diffraction grating 112 on the scale 111 moves by ½ pitch, a light-and-dark signal of one period is generated. A signal whose phase is inverted from that of a signal obtained from the photosensor 104B1 can be obtained from the photosensor 104B2. If the pitch of the diffraction grating equals 1.6 μm, a sinusoidal signal having a period of 0.8 μm is obtained.

The light beams $R_{-1}{}^{+1}{}_0$ and $R_0^{-1}{}_{+1}$ whose optical paths are superposed at the diffraction gratings 103C1 and 103C2 become interfering light, which is incident upon photosensors 104C1 and 104C2. At that time, the interference phases of the light beams incident upon the photosensors 104C1 and 104C2 are:

(−2πx/P−π/2)−(+2πx/P)=−4πx/P−π/2, and $(-2\pi x/P-3\pi/2)-(+2\pi x/P)=-4\pi x/P-3\pi/2$, respectively Every time the diffraction grating 112 on the scale 111 moves by ½ pitch, a light-and-dark signal of one period is generated. The pitches of a light-and-dark pattern are shifted by the ¼ period from each other in the photosensors 104B1 and 104B2.

That is, encoder signals, serving as periodic signals having periods shifted by the ¼ period from each other, which are usually called an A-phase signal and a B-phase signal, whose periods change in accordance with the relative movement of the diffraction grating 112 on the scale 111, can be obtained at terminals A and B through differential circuits 105B and 105C, respectively, each of which provides the difference between the to signals.

By using the A-phase signal and the B-phase signal, the amount and the direction of relative movement of the diffraction grating 112 on the scale 111 can be measured by a well-known method.

As described above, in accordance with the displacement of the scale 111, periodic signals having periods shifted by the ¼ period from each other are obtained from the photosensors 104B1, 104B2, 104C1 and 104C2. A state of relative displacement between the above-described sensor unit and the scale 111 can be detected based on the obtained signals using a known signal processing circuit (not shown).

In accordance with the distance between the scale 111, and the photosensors 104B1, 104B2, 104C1 and 104C2, and the state (relating to divergence and convergence) of the light beams, lenses may be omitted or added.

The diffraction gratings 103B1, 103B2, 103C1, and 103C2 are usually provided on a single transparent plate (for example, a glass substrate) using a replica technique or photoetching. In the case shown in FIG. 1, the portion (the sensor unit) other than the scale 111, which includes the diffraction grating 112, is accommodated within a single case, and is usually called a "head".

SUMMARY OF THE INVENTION

The present invention relates to an improvement in the above-described apparatus.

It is an object of the present invention to provide an optical displacement sensor for simultaneously detecting the amounts of displacement in the directions of two axes, and a driving system which uses the sensor.

It is another object of the present invention to provide an optical displacement sensor in which the occurrence of differences between the amplitudes of signals, and the occurrence of variations in a phase difference between two signals are prevented, and in which requests for positional accuracy between diffraction gratings provided at both sides of another diffraction grating are mitigated, and to provide a driving system which uses the optical displacement sensor.

According to one aspect, the present invention which achieves these objectives relates to an apparatus for optically detecting information relating to relative displacement of an object to be measured on which a diffraction grating arranged in two axial directions with a predetermined pitch is formed, comprising a light-emitting device, a first optical element for dividing a light beam from the light-emitting device into a plurality of light beams in each of the two axial directions, a second optical element for combining a plurality of light beams divided in each of the two axial directions by the first optical element and diffracted by the diffraction grating on the object, for each of the two axial directions, and a plurality of detection units, each for detecting the light beams combined by the second optical element for each of the two axial directions. Information relating to relative displacement of the object in each of the two axial directions is detected by the detection of each of the plurality of detection units.

According to another aspect, the present invention relates to a driving system or relatively driving two objects, comprising a driving unit for relatively driving the two objects, a scale, provided on one of the objects, on which a diffraction grating arranged in two axial directions with a predetermined pitch is formed, a light-emitting device, a first optical element for dividing a light beam from the light-emitting device into a plurality of light beams in each of the two axial directions, a second optical element for combining the plurality of light beams divided in each of the two axial directions by the first optical element and diffracted by the diffraction grating on the object, for each of the two axial directions, a plurality of detection units, each for detecting the light beams combined by the second optical element for each of the two axial directions, information relating to relative displacement of the object in each of the two axial directions being detected by the detection of each of the plurality of detection units, and a control unit for controlling the driving unit based on outputs from the plurality of detection units.

According to still another aspect, the present invention relates to an apparatus for optically detecting information relating to relative displacement of an object to be measured on which a diffraction grating arranged in two axial directions with a predetermined pitch is formed, comprising light source means for emitting a light beam, light beam dividing means for dividing the light beam from the light source means into a plurality of light beams in each of the two axial directions, light beam combining means for combining the plurality of light beams divided in each of the two axial directions by the light beam dividing means and diffracted by the diffraction grating on the object, for each of the two axial directions, and detection means, each for detecting the light beams combined by the light beam combining means for each of the two axial directions. Information relating to relative displacement of the object in each of the two axial directions is detected by the detection of each of the detection means.

According to yet another aspect, the present invention relates to an apparatus for optically detecting information relating to the relative displacement of an object on which a diffraction grating, arranged in two axial directions with a predetermined pitch, is formed. The apparatus comprises a light-emitting device configured to emit a light beam, a first optical element configured to divide the light beam from the light-emitting device into a plurality of light beams directed in each of the two axial directions to the diffraction grating on the object which produces a plurality of diffracted light beams for each of the two axial directions, a second optical element positioned and configured to receive and combine a plurality of diffracted light beams for each of the two axial directions from the diffraction grating on the object, and a plurality of detection units, each configured to receive and detect the combined plurality of diffracted light beams for one of the two axial directions, thereby detecting information relating to the relative displacement of the object in each of the two axial directions.

According to another aspect, the present invention relates to a driving system for driving an object in two directions. The system comprises a driving unit for driving the object in two directions, a scale, provided on the object, a diffraction grating formed on the scale in two axial directions with a predetermined pitch, and a light-emitting device configured to emit alight beam. The system also comprises a first optical element configured to divide the light beam from the light-emitting device into a plurality of light beams directed in each of the two axial directions to the diffraction grating, wherein the diffraction grating diffracts the plurality of light beams in each of the two axial directions, a second optical element positioned and configured to receive an combine the plurality of diffracted light beams for each of the two axial directions, a plurality of detection units, each configured to receive and detect the combined plurality of diffracted light beams for one of the two axial directions, and to output information relating to relative displacement of the object in each of the two axial directions, and control unit for controlling the driving unit based on the outputs from the plurality of detection units.

According to yet another aspect, the present invention relates to an apparatus for optically detecting information relating to the relative displacement of an object on which a diffraction grating, arranged in two axial directions with a predetermined pitch, is formed. The apparatus comprises light source means for emitting a light beam, light beam dividing means for dividing the light beam from the light source means into a plurality of light beams directed in each of the two axial directions to the diffraction grating on the object which produces plurality of diffracted light beams for each of the two axial directions, light beam combining means for receiving and combining a plurality of diffracted light beams for each of the two axial directions from the diffraction grating formed on the object, and detection means, for detecting the combined plurality of diffracted light beams for each of the two axial directions, and for detecting information relating to the relative displacement of the object in each of the two axial directions.

The foregoing and other objects, advantages and features of the present invention will become more apparent from the following description of the preferred embodiments taken in conjunction with the accompanying drawings.

DESCRIPTION OF THE PREFERRED EMBODIMENTS

First Embodiment

Figure 1:
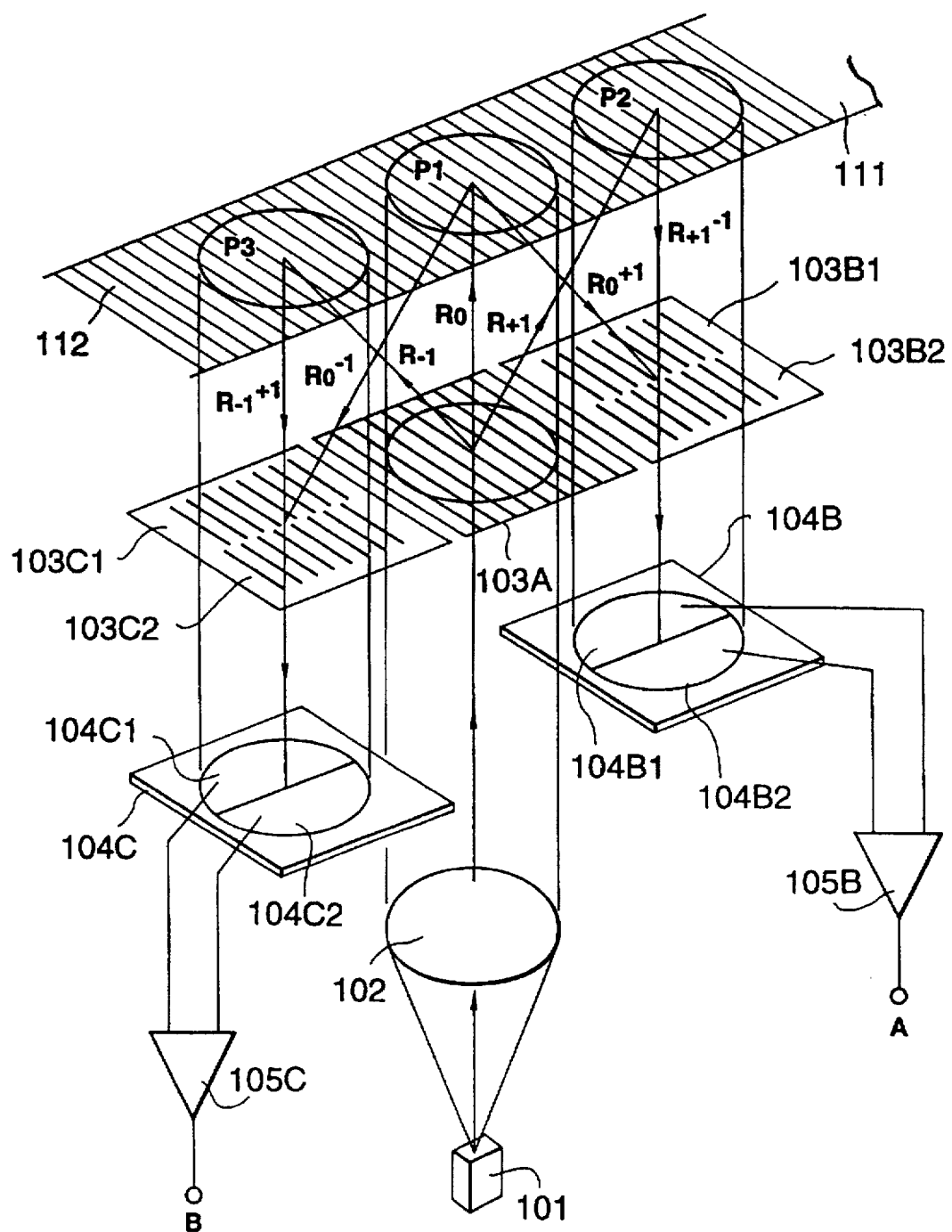
FIG. 1 is a schematic diagram illustrating the configuration of a conventional optical displacement sensor.
Figure 2A:
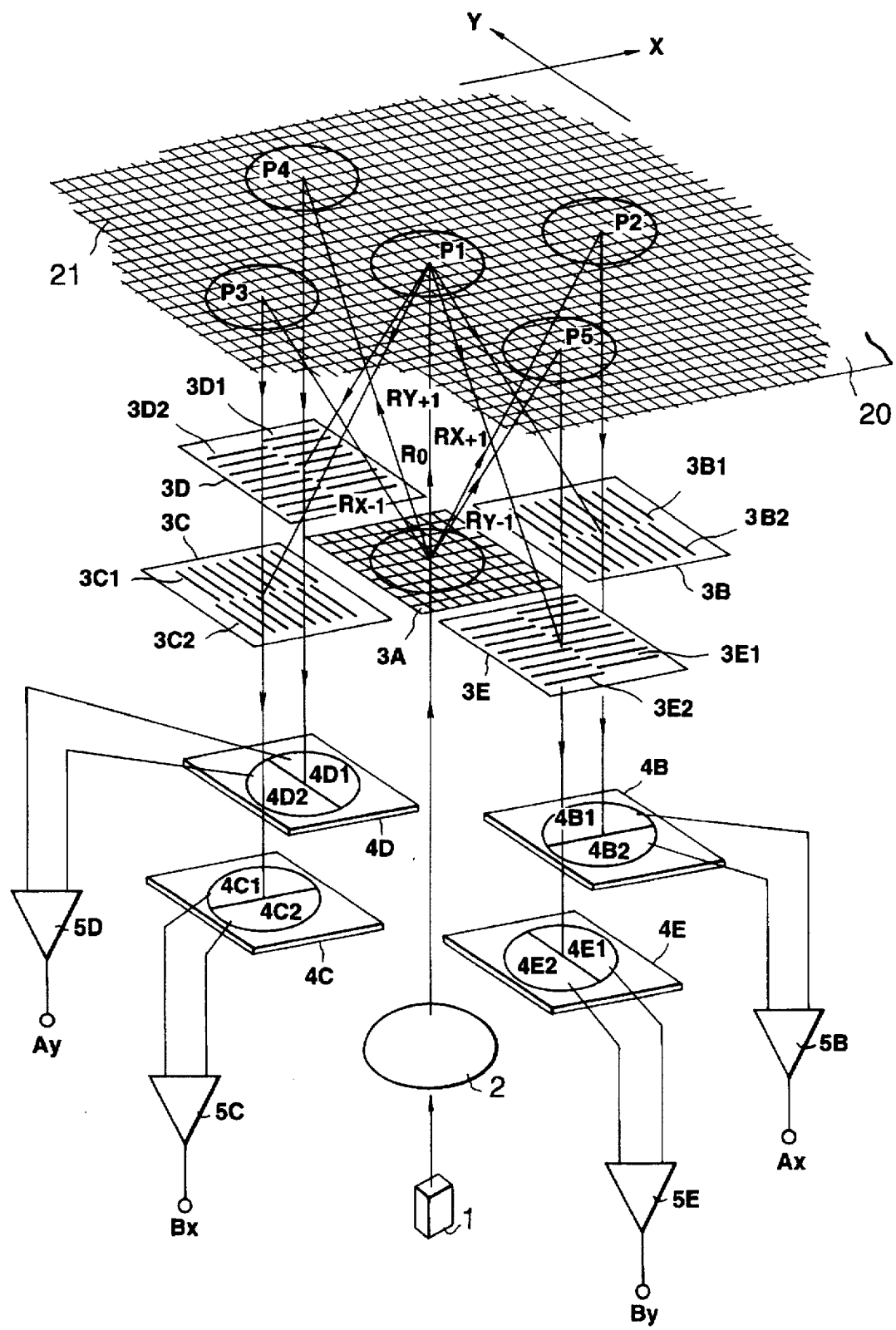
FIG. 2A is a schematic diagram illustrating the configuration of a biaxial displacement sensor, serving as an optical displacement sensor, according to a first embodiment of the present invention.

FIG. 2A is a diagram illustrating the configuration of an optical displacement sensor according to a first embodiment of the present invention. In FIG. 2A, each of a diffraction grating 3A, and a diffraction grating 21, which is formed on a scale 20, comprises two groups of grating elements for diffracting light, orthogonal to each other in the direction of two axes. That is, as shown in FIG. 2A, each of the diffraction gratings 3A and 21 comprises two groups of grating elements arranged with a predetermined pitch in the directions of the x and y axes.

As shown in FIG. 2A, the sensor also comprises diffraction gratings 3B, 3C, 3D and 3E each of which comprises two diffraction gratings. That is, the diffraction grating 3B comprises diffraction gratings 3B1 and 3B2, the diffraction grating 3C comprises diffraction gratings 3C1 and 3C2, the diffraction grating 3D comprises diffraction gratings 3D1 and 3D2, and the diffraction grating 3E comprises diffraction gratings 3E1 and 3E2. As in the above-described conventional example, the phase relationship of the grating's arrangement of the diffraction grating 3C1 is shifted by P/4 relative to that of the diffraction grating 3B1, and the phase relationships of the grating's arrangements of the diffraction gratings 3B2 and 3C2 are shifted by P/2 relative to those of the diffraction gratings 3B1 and 3C1, respectively. Similarly, the phase relationship of the grating's arrangement of the diffraction grating 3D1 is shifted by P/4 relative to that of the diffraction grating 3E1, and the phase relationships of the grating's arrangements of the diffraction gratings 3D2 and 3E2 are shifted by P/2 relative to those of the diffraction gratings 3D1 and 3E1, respectively. (P is the grating pitch of each diffraction grating).

The diffraction gratings 3D and 3E are disposed on an axis orthogonal to the axis of the diffraction gratings 3B and 3C across the diffraction grating 3A. Photosensors 4B, 4C, 4D and 4E are divided into photosensing surfaces 4B1 and 4B2, 4C1 and 4C2, 4D1 and 4D2, and 4E1 and 4E2 corresponding to the diffraction gratings 3B1 and 3B2, 3C1 and 3C2, 3D1and 3D2, and 3E1 and 3E2, respectively. The light beams combined by each diffraction grating are incident upon the corresponding photosensing surface. Optical paths necessary for the operation of the apparatus are indicated by straight lines having arrows. However, in order to avoid confusion, light beams are indicated only on the diffraction gratings 3A and 21.

Differential circuits 5B–5E output respective differences between the outputs of the photosensing surfaces 4B1 and 4B2, 4C1 and 4C2, 4D1 and 4D2, and 4E1 and 4E2. The outputs of the differential circuits 5B–5E are connected to terminals Ax, Bx, Ay and By, respectively. Each differential circuit outputs the difference between signals having phases different by 180° from each other generated by the operation of the apparatus, which will be described later.

Usually, the diffraction gratings 3A, 3B, 3C, 3D and 3E are configured on a single transparent plate. The diffraction gratings 3A–3E, and the diffraction grating 21, which is on the scale 20, have the same pitch (for example, 1.6 μm). The diffraction grating 21 can be very precisely formed by a replica technique or photoetching. The diffraction gratings 3A, 3B, 3C, 3D and 3E can be very precisely formed with ease by the same approach.

Next, the operation of the sensor will be described. Light emitted from a light-emitting device 1, such as a semiconductor laser, a light-emitting diode, or the like, is converted into a light beam by a lens 2, and is incident upon the diffraction grating 3A. The light beam is subjected to transmission diffraction by the diffraction grating 3A, and is divided into a plurality of light beams, including a 0-order diffracted light beam $R_0$, a +1st-order diffracted light beam $RX_{+1}$ and a −1st-order diffracted light beam $RX_{-1}$ in the x-axis direction, and a −1st-order diffracted light beam $RY_{-1}$ and a +1st-order diffracted light beam $RY_{+1}$ in the y-axis direction. These five diffracted light beams are incident upon points P1, P2, P3, P4 and P5 on the diffraction grating 21 formed on the scale 20, respectively (each circle shown in FIG. 2A indicates the cross section of each light beam). Diffracted light beams are generated from each point in the x and y directions. Diffracted light beams from the points P2 and P3 in the x direction, and diffracted light beams from the points P4 and P5 in the y direction are measured.

The same operation as he above-described operation is obtained for the optical paths of the 0-order diffracted light beam $R_0$, and the diffracted light beams $RX_{+1}$ and $RX_{-1}$ in the x-axis direction by a principle which is substantially the same as that described with respect to the optical paths $R_0$, $R_{+1}$ and $R_{-1}$ in the conventional apparatus. That is, the diffracted light beams from the points P1, P2 and P3 are combined by the diffraction gratings 3B and 3C, and are detected by the photosensors 4B and 4C, so that an A-phase signal and a B-phase signal corresponding to the movement of the diffraction grating 21 on the scale 20 in the x direction are obtained from the terminals Ax and Bx, respectively. The same operation is also obtained for the optical paths of the 0-order diffracted light beam $R_0$, and the diffracted light beam $RY_{+1}$ and $RY_{-1}$ in the y-axis direction by a principle which is substantially the same as that described with respect to the optical paths $R_0$, $R_{+1}$ and $R_{-1}$ in the conventional apparatus. That is, the diffracted light beams from the points P1, P4 and P5 are combined by the diffraction gratings 3D And 3E, and are detected by the photosensors 4D and 4E, so hat an A-phase signal and a B-phase signal corresponding to the movement of the diffraction grating 21 on the scale 20 in the y direction are obtained from the terminals Ay and By, respectively.

That is, in this configuration, relative displacement between the diffraction grating 21 on the scale 20, and the head unit both in the x-axis direction and in the y-axis direction can be simultaneously detected. In other words, relative displacement can be simultaneously obtained two-dimensionally using a single pair of a scale and a head.

Accordingly,by assembling a light source, diffraction gratings, photodetectors, hd the like as a small unit, a small and precise biaxial displacement sensor can be realized. The detection of the amount and the direction of movement by signal processing is performed by a signal processing unit (not shown).

Figure 2B:
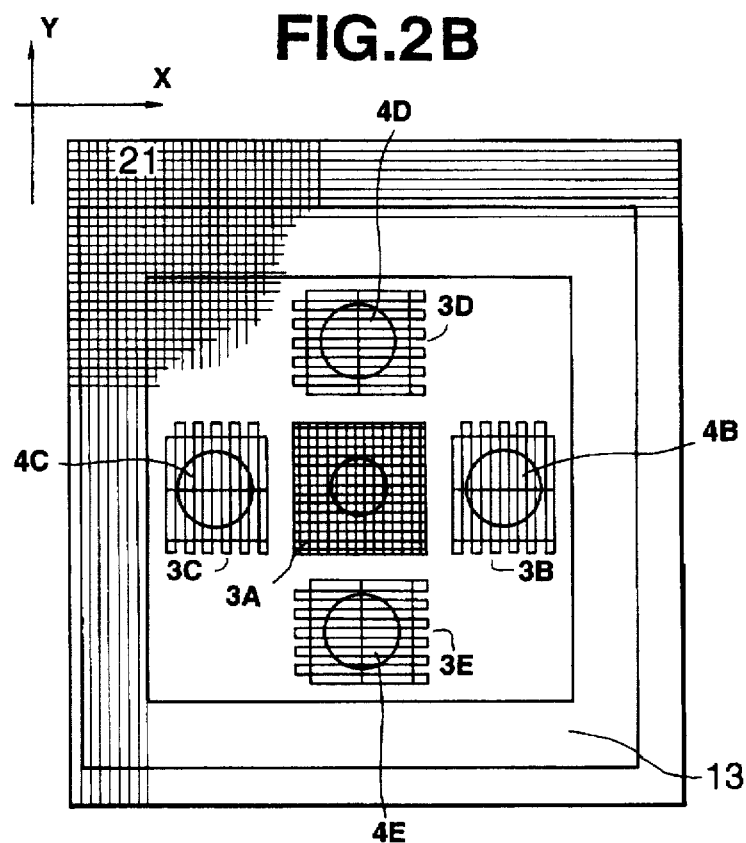
FIG. 2B is a plan view of the biaxial displacement sensor of the first embodiment, as seen from the side of a scale.
Figure 3:
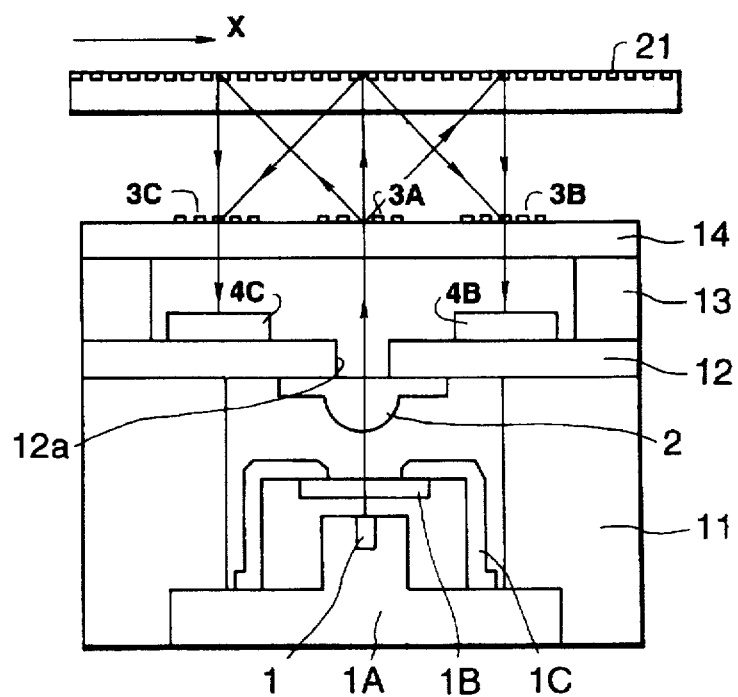
FIG. 3 is a cross-sectional view of the biaxial displacement sensor shown in FIG. 2B, as seen along the x axis.
Figure 4:
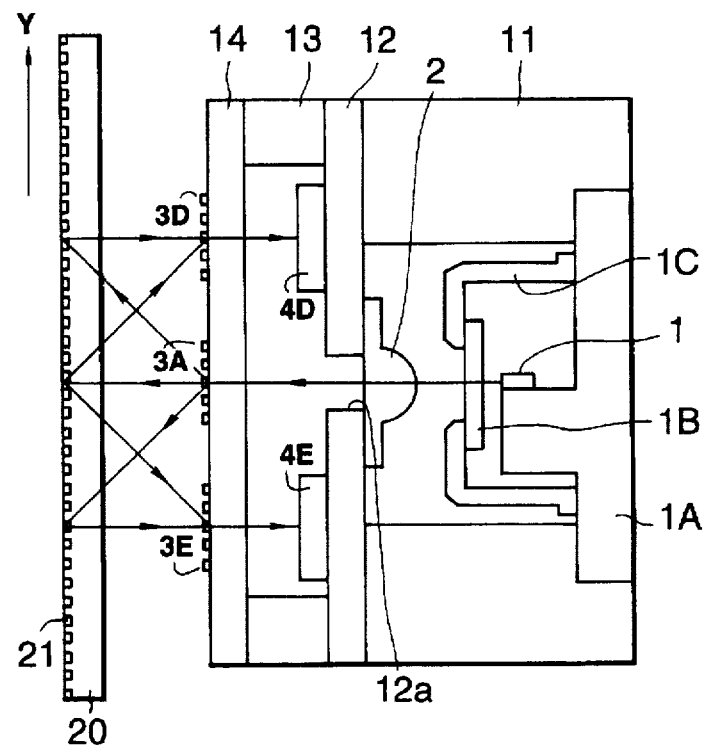
FIG. 4 is a cross-sectional view of the biaxial displacement sensor shown in FIG. 2B, as seen along the y axis.

FIGS. 2B, 3 and 4 illustrate a specific example of the state in which respective components re assembled. FIG. 2B is a plan view of a biaxial displacement sensor, as seen from the side of a scale. FIGS. 3 and 4 are cross-sectional views of the sensor shown in FIG. 2B, which are obtained by cutting the sensor by a plane passing through the neighborhood of the head, as seen along the x axis and the y axis, respectively. In FIGS. 2B, 3 and 4, the same components as those shown in FIG. 2A are indicated by the same reference numerals, and a description thereof will be omitted. In order to avoid complications in the drawings, most of the diffraction grating 21 on the scale 20 and the electrical connections are omitted.

In FIGS. 2B, 3 and 4, a light source 1 comprises, for example, a semiconductor laser, whose chip is mounted on a stem 1A, and is sealed by a cap 1C and a cover glass 1B. The encapsulated semiconductor laser 1 is mounted in a holder 11.

A circuit substrate 12 is made of a glass-epoxy resin, a ceramic, or the like, and has a hole 12a for passing a light beam at its center. A lens 2 is mounted at the back of the hole 12a. The photosensors 4B, 4C, 4D and 4E (each having two divided photosensing surfaces) are mounted on the surface of the circuit substrate 12. The circuit substrate 12 is mounted on the holder 11, for example, by being bonded thereto.

A transparent plate 14 is mounted on the circuit substrate 12 via a spacer 13 provided on the outer circumference of the circuit substrate 12. The diffraction gratings 3A, 3B, 3C, 3D and 3E are formed on the transparent plate 14 by a replica technique, photoetching, or the like. The diffraction grating 21 on the scale 20 is disposed above the transparent plate 14 at a predetermined distance.

By the above-described configuration, a very small biaxial displacement sensor can be realized. In consideration of the package size of the light source 1 (for example, the maximum diameter 5.6 mm of the stem 1A), it can be estimated that it is relatively easy to reduce the size of the head to be equal to or less than a 10 mm cube.

The biaxial displacement sensor of the first embodiment has, for example, the following features.

(1) Since three diffraction gratings (3A, 21, and 3B or 3C, or 3A, 21, and 3D or are used, even if the diffraction angle changes caused by a change in the wavelength of the light from the light source 1, the change is corrected by an inverse change at the second-time diffraction, so that the angle of the light beams emanating from the diffraction gratings 3B, 3C, 3D and 3E toward the photosensors 4B, 4C, 4D and 4E, respectively, are always kept constant, and a state of two superposed light beams and differences between the advancing directions of the light beams are preserved. Accordingly, a semi-conductor light-emitting device, whose wavelength inevitably changes due to changes in the temperature, can be used as the light source 1 without performing temperature compensation.

(2) Even if the degree of parallelism between the diffraction grating 21 and other diffraction gratings 3A–3E is more or less shifted, the directions of the optical paths of two interefering light beams shift in the same direction. Hence, a state of two superposed light beams and differences between the advancing directions of the light beams tend to be preserved. As a result, it is possible to realize a displacement sensor in which strict accuracy in the mounting of a scale and a head is not required, and which is very easy to use.

(3) In order to obtain signals having phase differences, it is only necessary to shift the phases of the diffraction gratings 3B, 3C, 3D and 3E, so that it is unnecessary to use a dividing optical system for that purpose.

(4) The diffraction angle increases as the pitch of the diffraction grating 21 on the scale 20 becomes finer, so that diffracted light beams can be sufficiently separated spatially even if the distance to the scale is small. Hence, a small sensor can be provided.

Although in the above-described first embodiment, the lens is used only for collimating the light emitted from the light source 1, lenses may be used between the diffraction gratings 3B, 3C, 3D and 3E and the photosensors 4B, 4C, 4D and 4E, respectively, in order to adjust the sizes of light beams with the sizes of the photosensors.

Second Embodiment

By mounting the photosensors 4B–4E and the light source 1 on the same substrate, the depth of the head can be reduced, so that a smaller sensor can be obtained.

Figure 5:
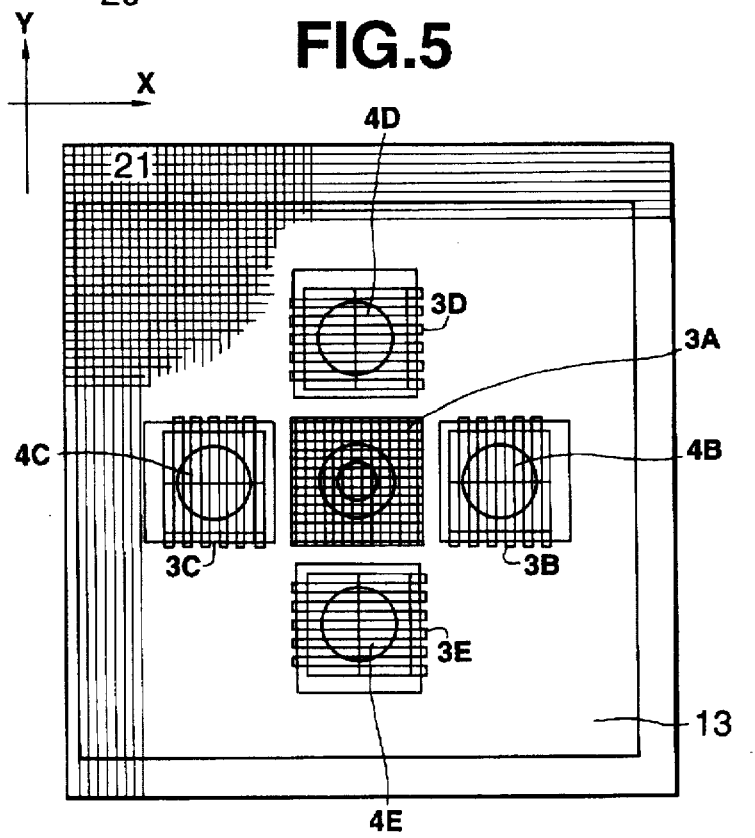
FIG. 5 is a plan view of a biaxial displacement sensor according to a second embodiment of the present invention, as seen from the side of a scale.
Figure 6:
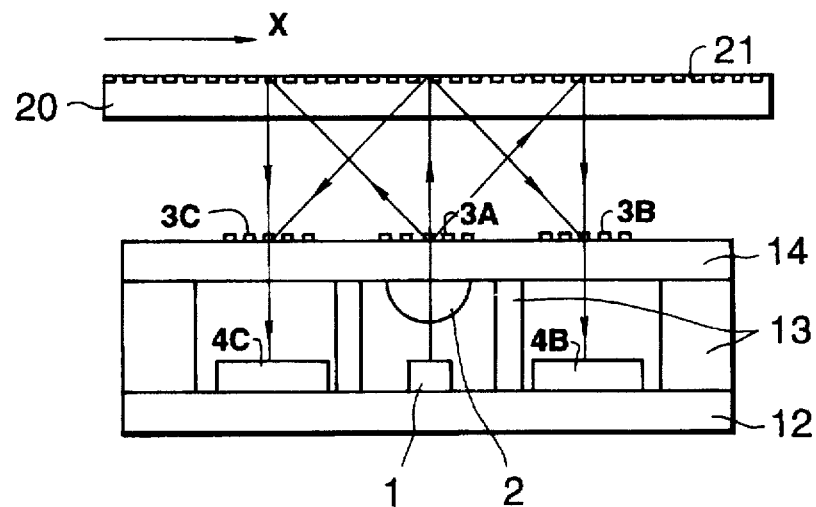
FIG. 6 is a cross-sectional view of the biaxial displacement sensor shown in FIG. 5, as seen along the x axis.
Figure 7:
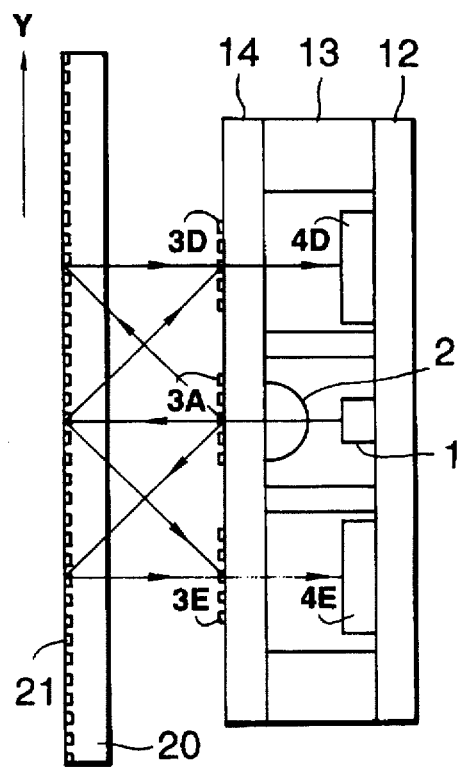
FIG. 7 is a cross-sectional view of the biaxial displacement sensor shown in FIG. 6, as seen along the y axis.

FIGS. 5 through 7 illustrate a sensor having the above described configuration according to a second embodiment of the present invention. FIG. 5 is a plan view of the sensor. FIGS. 6 and 7 are cross-sectional views of the sensor obtained by cutting it by a plane passing through the neighborhood of the center of the head, as seen along the x axis and the y axis, respectively.

An LED (light-emitting diode) is used as a light source 1, and a lens 2 is formed on the back of a transparent substrate 14. The lens 2 can be manufactured at a low cost if it is formed by a replica technique. The shape of a spacer 13 is changed from that of the spacer 13 used in the first embodiment. In order to remove any adverse influence caused by direct light from the light source 1 to the photosensors 4B–4E, spacers 13 are also provided between the light source 1 and the photosensors 4B–4E so as to provide a light-blocking function. According to such a configuration, the thickness of the head can be further reduced.

Third Embodiment

Figure 8:
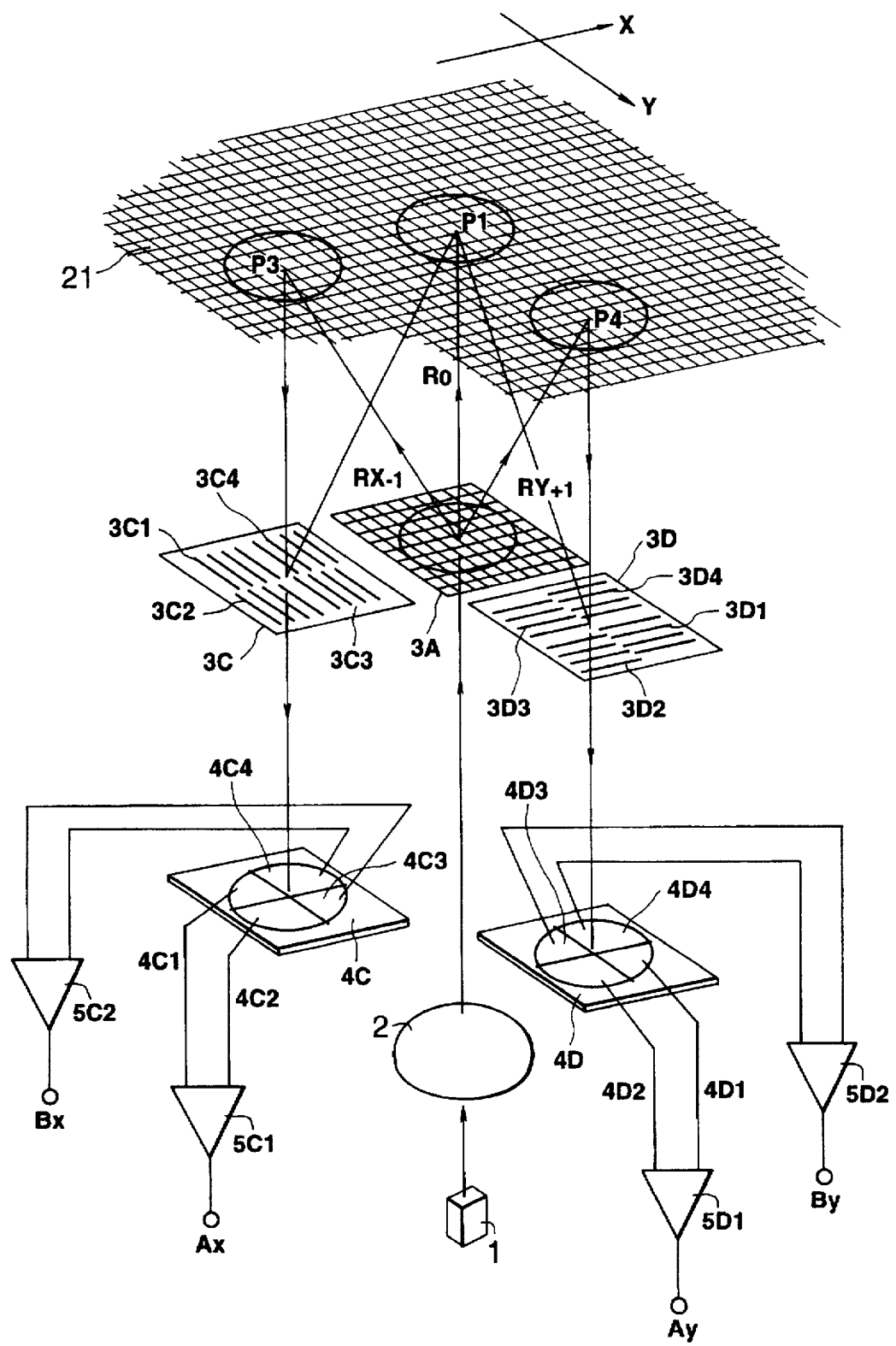
FIG. 8 is a schematic diagram illustrating the configuration of a biaxial displacement sensor, serving as an optical displacement sensor, according to a third embodiment of the present invention.

FIG. 8 is a diagram illustrating the configuration of an optical displacement sensor according to a third embodiment of the present invention. In FIG. 8, each of a diffraction grating 3A, and a diffraction grating 21, which is on a scale 20, comprises two groups of grating elements for diffracting light which are orthogonal to each other in the directions of two axes. Also provided is a diffraction grating 3D which is orthogonal to a diffraction grating 3C. Each of the diffraction gratings 3C and 3D is divided into four regions, which are shifted from each other with a predetermined pitch.

For example, there is a phase difference of 180° between divided regions 3C1 and 3C2, and between divided regions 3C3 and 3C4 of the diffraction grating 3C, and there is a phase difference of 90° between the divided regions 3C1 and 3C4. Similarly, there is a phase difference of 180° between divided regions 3D1 and 3D2, and between divided regions 3D3 and 3D4 of the diffraction grating 3D, and there is a phase difference of 90° between the divide regions 3D1 and 3D4.

The photosensing surfaces of photosensors 4C and 4D are divided into divided regions 4C1, 4C2, 4C3 and 4C4, and divided regions 4D1, 4D2, 4D3 and 4D4 corresponding to the divided regions 3C1, 3C2, 3C3 and 3C4 of the diffraction grating 3C, and the divided regions 3D1, 3D2, 3D3 and 3D4 of the diffraction grating 3D, respectively. That is, the light beams combined by each divided region of each diffraction grating are incident upon the corresponding divided region of the corresponding photosensor. Optical paths necessary for the operation are indicated by straight lines having arrows. In order to avoid confusion, light beams are indicated only on the diffraction gratings 3A and 21. Differential circuits 5C1, 5C2, 5D1 and 5D2 output the differences between the outputs of the divided regions 4C1 and 4C2 of the photosensor 4C, between the outputs of the divided regions 4C3 and 4C4 of the photosensor 4C, between the outputs of the divided regions 4D1 an 4D2 of the photosensor 4D, and between the outputs of the divided regions 4D3 and 4D4 of the photosensor 4D, respectively. The outputs of the differential circuits 5C1, 5C2, 5D1 and 5D2 are connected to terminals Ax, Bx, Ay and By, respectively.

The diffraction gratings 3A, 3C and 3D, and the diffraction grating 21 on the scale 20 have the same pitch (for example, 1.6 μm).

In FIG. 8, light emitted from a light-emitting device 1, such as a semiconducor laser, a light-emitting diode, or the like, is converted into a light beam by a lens 2, and is incident upon the diffraction grating 3A. The light beam is subjected to transmission diffraction by the diffraction grating 3A, and is divided into a plurality of light beams, including a 0-order diffracted light beam $R_0$, a $-1$st-order diffracted light beam $RX_{-1}$ in the x-axis direction, and a $+1$st-order diffracted light beam $RY_{+1}$ in the y-axis direction. These three diffracted light beams are incident upon points P1, P3 and P4 on the diffraction grating 21, which is formed on the scale 20, respectively.

As in the first embodiment, the diffraction grating 21 can be very precisely formed by a replica technique or photo-etching. The diffraction gratings 3A, 3C and 3D can also be easily and very precisely formed on a single transparent plate by the same approach.

The same operation as the above-described operation is obtained for the optical paths of the 0-order diffracted light beam $R_0$ and the diffracted light beam $RX_{-1}$ in the x-axis direction by a principle which is substantially the same as that described in the first embodiment. In the present embodiment, the diffracted light beam $RY_{+1}$ is not used, and four diffraction gratings having shifted phases are provided on the diffraction grating 3C, so that an A-phase signal and a B-phase signal corresponding to the movement of the grating 21 on the scale 20 in the x direction are obtained from the terminals Ax and Bx. The same operation is also obtained for the optical paths of the 0-order diffracted light beam $R_0$ and the diffracted light beam $RY_{+1}$ in the y-axis direction by a principle which is substantially the same as that described in the first embodiment, except that the diffracted light beam $RY_{-1}$ is not used, and four diffraction gratings having shifted phases are provided on the diffraction grating 3D, so that an A-phase signal and a B-phase signal, corresponding to the movement of the grating 21 on the scale 20 in the y direction, are obtained from the terminals Ay and By.

As described above, since respective diffraction gratings are arranged in a state of being shifted from each other in the diffraction gratings 3C and 3D, a signal corresponding to phase shift of each diffraction grating is obtained on the corresponding photosensor. That is, in this configuration, relative displacement between the diffraction grating 21 on the scale 20, and the head unit in the x-axis direction and in the y-axis direction can be simultaneously detected. In other words, relative displacement can be simultaneously obtained two-dimensionally using a single pair of a scale and a head. Accordingly, by assembling a light source, diffraction gratings, photodetectors, and the like as a small unit, a small and precise biaxial displacement sensor can be realized.

In the above-described third embodiment, one light beam is divided into four light beams. The divided regions 4C2 and 4C3 of the photosensor 4C obtain inverted signals of the signals of the divided regions 4C1 and 4C4, respectively. Hence, essentially, if a combination of the divided regions 3C1 and 3C4 of the diffraction grating 3C, and the divided regions 4C1 and 4C4 of the photosensor 4C is present, the displacement of the scale in the x-axis direction can be detected. The same holds for the detection of the displacement of the scale in the y-axis direction.

Figure 9:
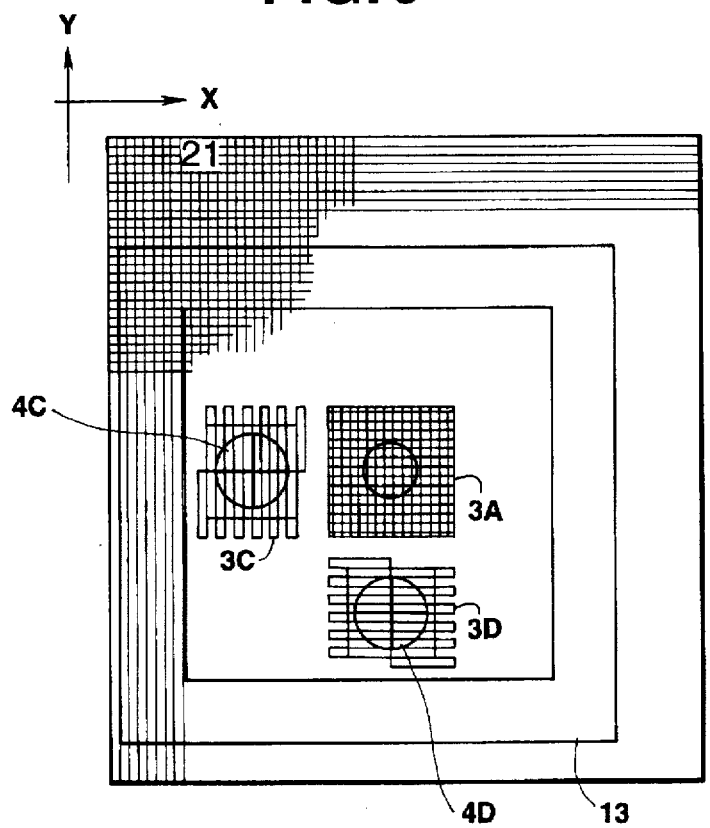
FIG. 9 is a plan view of the biaxial displacement sensor of the third embodiment, as seen from the side of a scale.
Figure 10:
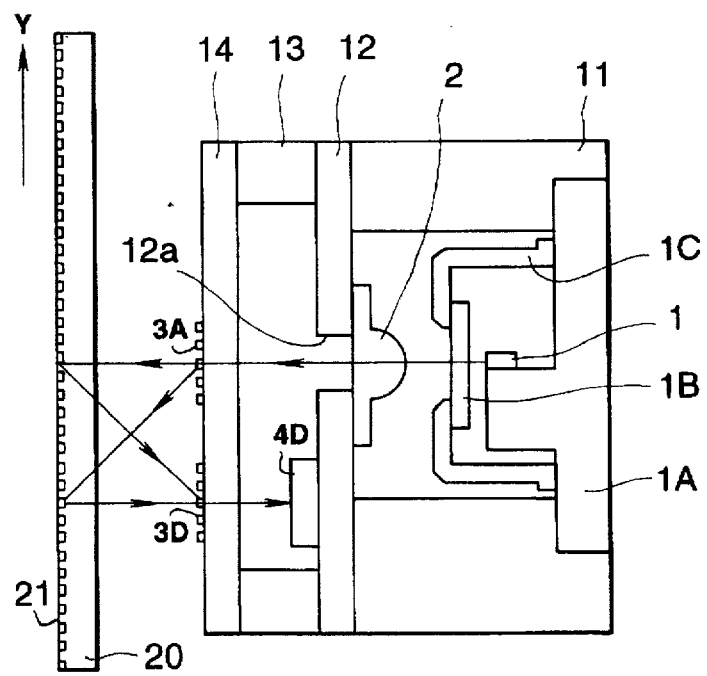
FIG. 10 is a cross-sectional view of the biaxial displacement sensor shown in FIG. 9, as seen along the x axis.
Figure 11:
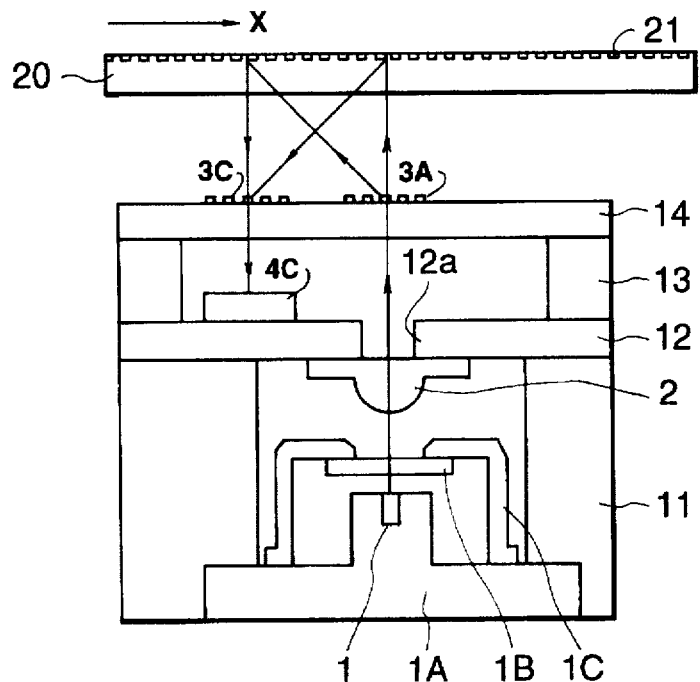
FIG. 11 is a cross-sectional view of the biaxial displacement sensor shown in FIG. 9, as seen along the y axis.

FIGS. 9 through 11 illustrate a specific example of the state in which respective components are assembled. FIG. 9 is a plan view of a biaxial displacement sensor, as seen from the side of a scale. FIGS. 9, 10 and 11 are cross-sectional views of the sensor shown in FIG. 9, which are obtained by cutting the sensor with a plane passing through the neighborhood of the light source of the head, as seen along the x axis and the y axis, respectively. In FIGS. 9 through 11, the same components as those shown in FIG. 8 are indicated by the same reference numerals, and a description thereof will be omitted. In order to avoid complications in the drawings, most of the diffraction grating 21 on the scale 20 and on the electrical connections are omitted.

In FIGS. 9 through 11, a light source 1 comprises, for example, a semiconductor laser, whose chip is mounted on a stem 1A, and is sealed by a cap 1c and a cover glass 1B. The encapsulated semiconductor laser 1 is mounted in a holder 11.

A circuit substrate 12 is made of a glass-epoxy resin, a ceramic, or the like, and has a hole 12a for passing a light beam at its center. A lens 2 is mounted at the back of the hole 12a. The photosensors 4C and 4D (each having two or four divided photosensing surfaces) are mounted on the surface of the circuit substrate 12. The circuit substrate 12 is mounted on the holder 11, for example, by being bonded thereto.

A transparent plate 14 is mounted on the circuit substrate 12 via a spacer 13 provided on the outer circumference of the circuit substrate 12. The diffraction gratings 3A, 3C and 3D are formed on the transparent plate 14 by a replica technique, photoetching, or the like. Each of the diffraction gratings 3C and 3D is divided into two or four gratings, whose pitches are shifted from each other by 90°. The diffraction grating 21 on the scale 20 is disposed above the transparent plate 14 at a predetermined distance.

By the above-described configuration, signals, whose phases are shifted from each other by 90°, can be obtained from the photosensors 4C a 4D, and a very small biaxial displacement sensor can be realized. In consideration of the package size of the light-emitting device (for example, the diameter of the stem of the laser diode which is most frequently used equals 5.6 mm), it can be estimated that it is easy to reduce the size of the head to be equal to or less than a 10 mm cube.

In addition to the above-described features (1) through (4) possessed by the biaxial displacement sensor shown in FIGS. 2A, 2B, 3 and 4, the biaxial displacement sensor of the third embodiment has the following features.

(5) Since a phase difference is provided within one pair of interfering light beams along each axis, the phase difference between respective phase signals is always stabilized. Since the diffraction efficiency based on the position of the scale simultaneously influences respective phase signals, it hardly affects the detection accuracy. Furthermore, it is unnecessary to strictly control positional accuracy among the diffraction gratings 3A, 3C and 3D, and therefore the sensor can be easily manufactured.

Although in the above described third embodiment, the lens is used only for collimating the light emitted from the light source, lenses may be used between the diffraction gratings 3C and 3D, and the photosensors in order to adjust the sizes of light beams wit the sizes of the photosensors.

Fourth Embodiment

Figure 12:
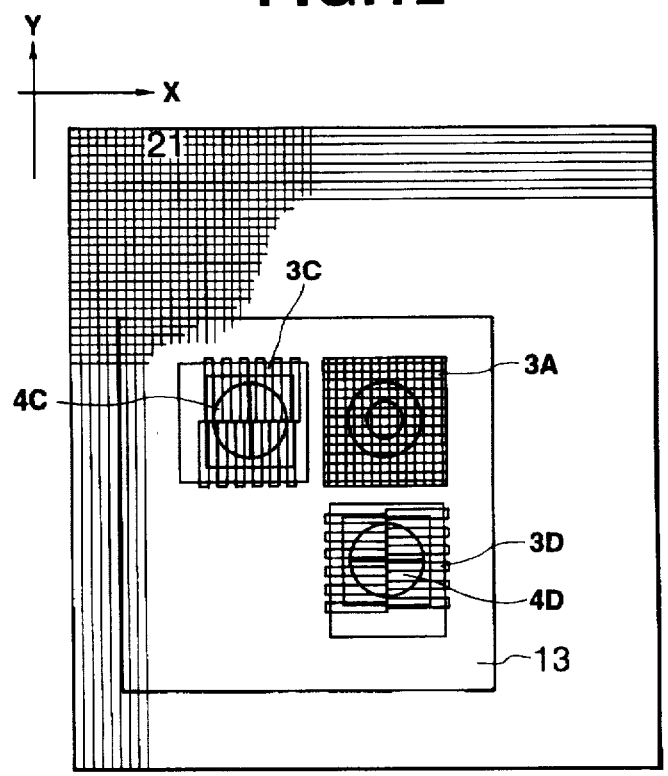
FIG. 12 is a plan view of a biaxial displacement sensor according to a fourth embodiment of the present invention, as seen from the side of a scale.
Figure 13:
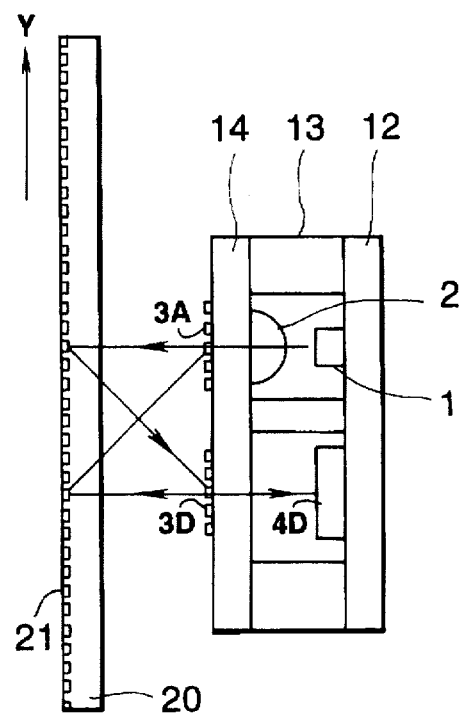
FIG. 13 is a cross-sectional view of the biaxial displacement sensor shown in FIG. 12, as seen along the x axis.
Figure 14:
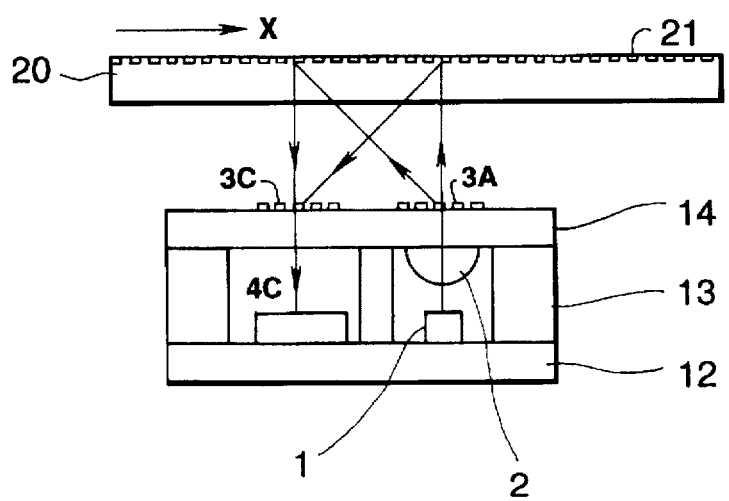
FIG. 14 is a cross-sectional view of the biaxial displacement sensor shown in FIG. 12, as seen along the y axis.

By mounting respective photosensors and a light source on the same substrate, the depth of the head can be reduced, so that a smaller sensor can be obtained. FIGS. 12 through 14 illustrate a sensor having the above-described configuration according to a fourth embodiment of the present invention. FIG. 12 is a plan view of the sensor. FIGS. 13 and 14 are cross-sectional views of the sensor obtained by cutting it by a plane passing through the neighborhood of the center of the head, as seen along the x axis and the y axis, respectively. An LED is used as a light source 1.

The same reference numerals as in the third embodiment denote identical or similar elements. Consequently, no further discussion of these elements is deemed necessary, except when these elements differ from those in the third embodiment.

In contrast to the third embodiment shown in FIGS. 9 through 11, a lens 2 is formed on the back of a transparent substrate 14. The lens 2 can be manufactured at a low cost if it is formed by a replica technique. The shape of a spacer 13 is changed from that of the spacer 13 used in the third embodiment. In order to remove the adverse influence of direct light from the light source 1 on the photosensors, spacers 13 are also provided between the light source 1 and the photosensors so as to provide a light-blocking function. According to such a configuration, the deleterious influence of stray light can be removed.

Although in the above-described embodiments, a description has been provided illustrating two orthogonal axes, a configuration, in which two other axes are selected whenever necessary, does not deviate from the concept of the present invention.

Fifth Embodiment

Figure 15:
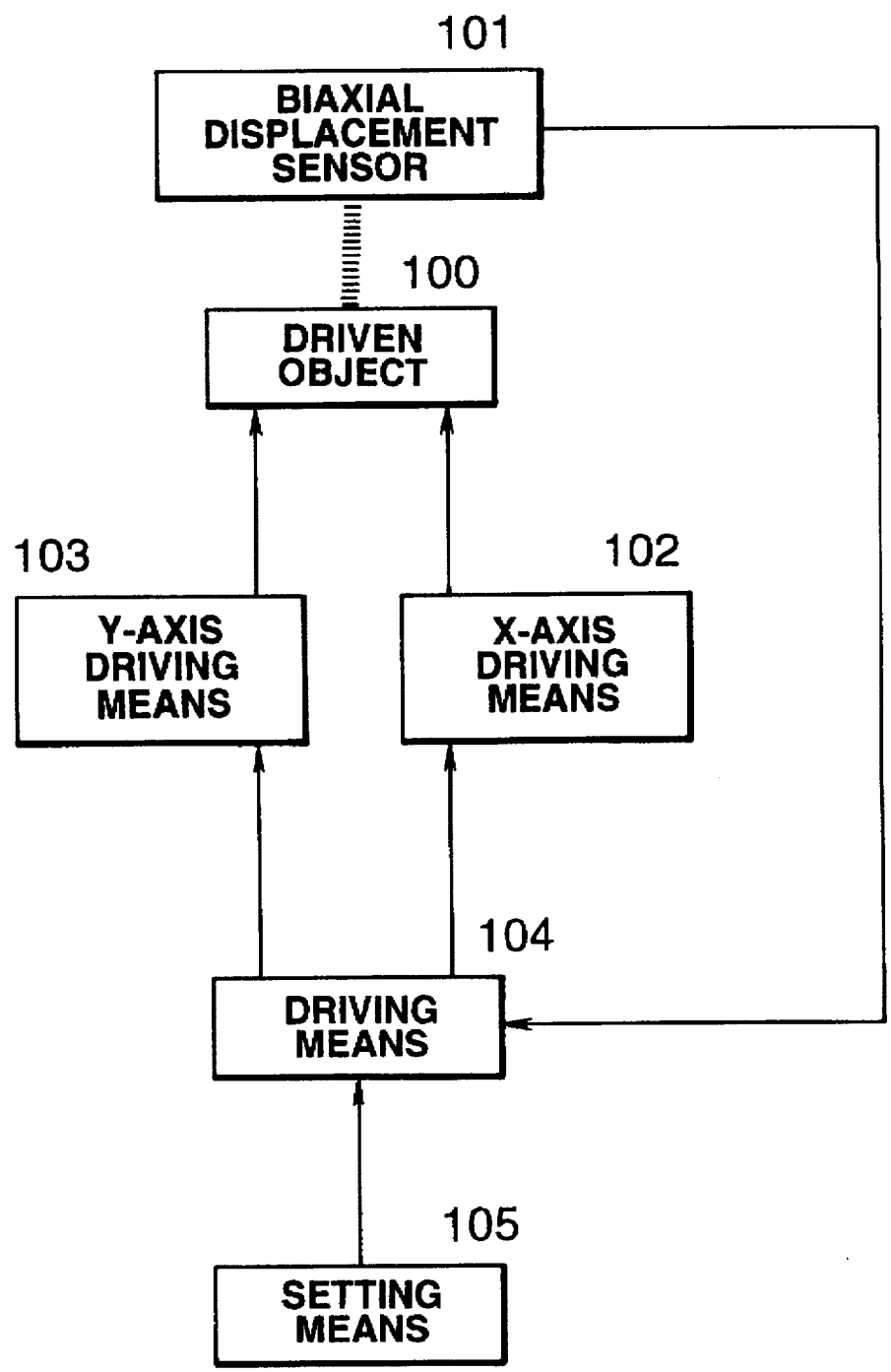
FIG. 15 is a block diagram illustrating a driving system according to a fifth embodiment of the present invention.

FIG. 15 is a block diagram illustrating a driving system, which uses any of the optical displacement sensors of the above-described embodiments, according to a fifth embodiment of the present invention. For example, position control of an XY stage is a typical example of the application of such a system. In FIG. 15, an optical displacement sensor 201, which is one of the sensors of the above-described embodiments, is mounted on an object 200 to be driven, such as a stage. The object 200 is driven by x-axis driving means 202 and y-axis driving means 203, each including a driving source, such as a motor, an actuator, or the like.

Detection outputs, comprising signals for the x axis and the y axis, from the optical displacement sensor 201 are subjected to feedback to control means 204. The control means 204, such as a CPU (central processing unit), transmits driving signals to the driving means 202 and 203 so as to provide a state set by setting means 205. According to such a feedback system, the desired state set by the setting means can be obtained.

Such a driving system can be widely applied to any apparatus including driving means, for example, a business machine, such as a printer, a copier, or the like, an image information recording/reproducing apparatus, such as an image reading apparatus, or the like, an industrial machine, such as a robot, a machine tool, a manufacturing apparatus, or the like.

According to the present invention, it is possible to obtain an optical displacement sensor which can simultaneously detect the amounts of displacement in the directions of two axes, and a driving system which uses the sensor, in a configuration that is easy to handle, has a small size and produces readings of high accuracy.

The individual components shown in outline or designated by blocks in the drawings are all well known in the displacement-information detection apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for optically detecting information relating to a relative displacement of an object on which a diffraction grating, arranged in two axial directions with a predetermined pitch, is formed, said apparatus comprising:
    a light-emitting device configured to emit a light beam;
    a first optical element configured to divide the light beam emitted from said light-emitting device and impinging on one area of said first optical element into a plurality of light beams directed in each of the two axial directions to the diffraction grating on the object, which produces a plurality of diffracted light beams for each of the two axial directions;
    a second optical element positioned and configured to receive and combine a plurality of diffracted light beams for each of the two axial directions from the diffraction grating on the object by diffracting at least one of the diffracted light beams; and
    a plurality of detection units, each configured to receive and detect the combined plurality of diffracted light beams from one of the two axial directions, thereby detecting information relating to a relative displacement of the object in each of the two axial directions.

2. An apparatus according to claim 1, wherein said light-emitting device comprises one of a semiconductor laser or a light-emitting diode.

3. An apparatus according to claim 1, wherein said first optical element comprises a plurality of diffraction gratings which divide the light beam from said light-emitting device and which are arranged in the two axial directions with a predetermined pitch.

4. An apparatus according to claim 1, wherein said second optical element comprises a plurality of diffraction gratings configured to combine a plurality of diffracted light beams at positions at least adjacent to said first optical element in the two axial directions, wherein each of said diffraction gratings of said second optical element combines a plurality of light beams in a corresponding one of the two axial directions, and wherein at least two of said detection units are provided in positions selected as a function of said diffraction gratings of said second optical element.

5. An apparatus according to claim 4, wherein each of said diffraction gratings of said second optical element includes two grating regions whose phases are shifted from each other, and wherein each of said detection units comprises two detection elements positioned corresponding to said two grating regions.

6. An apparatus according to claim 4, wherein each of said diffraction gratings of said second optical element includes four grating regions whose phases are shifted from each other, and wherein each of said detection units comprises four detection elements positioned corresponding to said four grating regions.

7. An apparatus according to claim 6, further comprising two differential circuits each configured to form a signal representing a difference between two outputs of said four detection elements, wherein information relating to a relative displacement of the object is detected from the signals obtained from said two differential circuits.

8. An apparatus according to claim 1, wherein said second optical element comprises a plurality of diffraction gratings configured to combine a plurality of diffracted light beams at four positions adjacent to four sides of said first optical element in the two axial directions, wherein each of said diffraction gratings of said second optical element combines a plurality of light beams, and wherein four of said detection units are provided in positions corresponding to said diffraction gratings of said second optical element.

9. An apparatus according to claim 8, wherein each of said diffraction gratings of said second optical element includes two grating regions whose phases are shifted from each other, and wherein each of said detection units comprises two detection elements corresponding to said two grating regions.

10. An apparatus according to claim 9, further comprising differential circuits each configured to form a signal representing a difference between outputs of said two detection elements, wherein information relating to a relative displacement of the object is detected from the signals obtained from said differential circuits.

11. An apparatus according to claim 1, further comprising a signal processing unit configured to process signals from said plurality of detection units.

12. An apparatus according to claim 11, further comprising a case for incorporating said plurality of detection units and said signal processing unit.

13. An apparatus according to claim 1, further comprising lenses provided in optical paths from said light-emitting device to said plurality of detection units.

14. An apparatus according to claim 1, wherein the two axial directions comprise two orthogonal directions.

15. A driving system for driving an object in two directions, said system comprising:
    a driving unit for driving the object in two directions;
    a scale, provided on the object, and a diffraction grating formed on said scale in two axial directions with a predetermined pitch;
    a light-emitting device configured to emit a light beam;
    a first optical element configured to divide the light beam emitted from said light-emitting device and impinging on one area of said first optical element into a plurality of light beams directed in each of the two axial directions to said diffraction grating, wherein said diffraction grating diffracts said plurality of light beams in each of the two axial directions;
    a second optical element positioned and configured to receive and combine the plurality of diffracted light beams for each of the two axial directions by diffracting at least one of the diffracted light beams;
    a plurality of detection units, each configured to receive and detect the combined plurality of diffracted light beams for one of the two axial directions, and to output information relating to a relative displacement of the object in each of the two axial directions; and a control unit for controlling said driving unit based on the outputs from said plurality of detection units.

16. An apparatus according to claim 15, wherein said driving unit comprises separate driving means for performing relative driving in each of the two axial directions.

17. An apparatus for optically detecting information relating to a relative displacement of an object on which a diffraction grating, arranged in two axial directions with a predetermined pitch, is formed, said apparatus comprising:

light source means for emitting a light beam;

light beam dividing means for dividing the light beam emitted from said light source means and impinging on one area of said light beam dividing means into a plurality of light beams directed in each of the two axial directions to the diffraction grating on the object which produces a plurality of diffracted light beams for each of the two axial directions;

light beam combining means for receiving and combining a plurality of diffracted light beams for each of the two axial directions from the diffraction grating formed on the object by diffracting at least one of the diffracted light beams; and detection means for detecting the combined diffracted light beams for each of the two axial directions, and for detecting information relating to a relative displacement of the object in each of the two axial directions.

18. An apparatus according to claim 17, wherein said light beam dividing means comprises a plurality of diffraction gratings for dividing a light beam, said diffraction gratings being arranged in the two axial directions with a predetermined pitch.

19. An apparatus according to claim 17, wherein said light beam combining means comprises a plurality of diffraction gratings for combining the plurality of diffracted light beams at positions at least adjacent to said light beam dividing means in the two axial directions, wherein each of said diffraction ratings of said combining means combines the plurality of light beams in a corresponding one of the two axial directions, and wherein at least two of said plurality of detection means are provided in positions corresponding to said diffraction gratings of said combining means.

* * * * *

UNITED STATES PATENT AND TRADEMARK OFFICE
CERTIFICATE OF CORRECTION

PATENT NO.   : 5,666,196
DATED        : September 9, 1997
INVENTOR(S)  : Ishii et al.

It is certified that error appears in the above-identified patent and that said Letters Patent is hereby corrected as shown below:

Title page, item [54]:

"WHCH" should read --WHICH--.

[57] ABSTRACT:

Line 4, "pitch." should read --pitch, is formed.--.

COLUMN 1:

Line 4, "WHCH" should read --WHICH--;
   Line 26, "the like" should read --the like,--;
   Line 41, "a-1st-order" should read --a -1st-order--; and
   Line 55, "the +1st-order" should read --the -1st-order--.

COLUMN 2:

Line 5, "diffrated" should read --diffracted--; and
   Line 56, "Whose" should read --whose--.

COLUMN 3:

Line 1, "respectively" should read --respectively.--;
   Line 14, "to" should read --two--; and
   Line 23, "sensor unit" should read --sensor units--.

UNITED STATES PATENT AND TRADEMARK OFFICE
CERTIFICATE OF CORRECTION

PATENT NO. : 5,666,196
DATED : September 9, 1997
INVENTOR(S) : Ishii et al.

Page 2 of 3

It is certified that error appears in the above-identified patent and that said Letters Patent is hereby corrected as shown below:

COLUMN 5:

Line 7, "receive an" should read --receive and--;
    Line 13, "and control" should read --and a control--;
    Line 25, "which produces" should read --which produces a--; and
    Line 58, "FIG. 6," should read --FIG. 5,--.

COLUMN 6:

Line 55, "3D1and" should read --3D1 and--.

COLUMN 7:
    Line 12, "ducor" should read --ductor--;
    Line 29, "he" should read --the--;
    Line 48, "And" should read --and--;
    Line 49, "hat" should read --that--;
    Line 60, "Accordingly,by" should read --Accordingly, by--;
    Line 61, "hd the like" should read --and the like,--; and
    Line 67, "re" should read --are--.

COLUMN 8:

Line 41, "or are" should read --or 3E) are--.

UNITED STATES PATENT AND TRADEMARK OFFICE
CERTIFICATE OF CORRECTION

PATENT NO.   : 5,666,196
DATED        : September 9, 1997
INVENTOR(S)  : Ishii et al.

It is certified that error appears in the above-identified patent and that said Letters Patent is hereby corrected as shown below:

COLUMN 10:

Line 26, "21can" should read --21 can--;
    Line 54, ""corresponding to" should read --corresponding to a--; and
    Line 63, "like as" should read --like, as--.

COLUMN 11:

Line 39, "is divided" should read --are divided--; and
    Line 66, "above described" should read --above-described--.

COLUMN 12:

Line 3, "wit" should read --with--.

COLUMN 16:

Line 16, "ratings" should read --gratings--.

Signed and Sealed this

Ninth Day of June, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,666,196
DATED : February 3, 1998
INVENTOR(S) : Watabe et al.

It is certified that error appears in the above-identified patent and that said Letters Patent is hereby corrected as shown below:

Title page,
Item [73], Assignee, "Canon Kabushikia Kaisha" should read -- Canon Kabushiki Kaisha --.

Column 6,
Line 15, "ah" should read -- an --.

Column 8,
Line 37, "mold; and" should read -- mold; --; and
Line 41, "mold;" should read -- mold; and --.

Signed and Sealed this

First Day of October, 2002

Attest:

Attesting Officer

JAMES E. ROGAN
Director of the United States Patent and Trademark Office